Oct. 14, 1941.          P. L. BETZ ET AL          2,258,696
                       STORAGE WATER HEATER
                        Filed Aug. 11, 1937
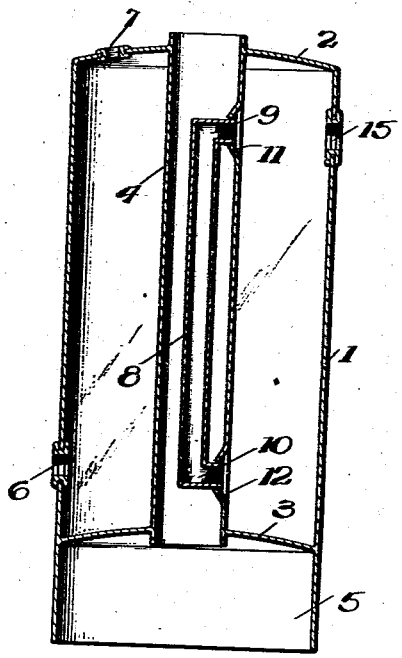
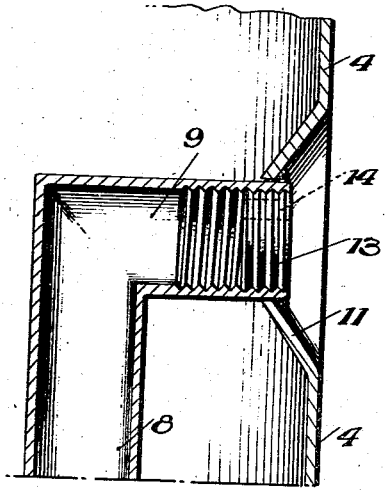
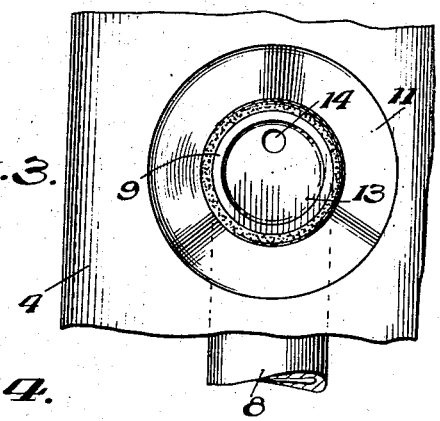
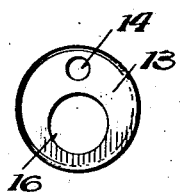
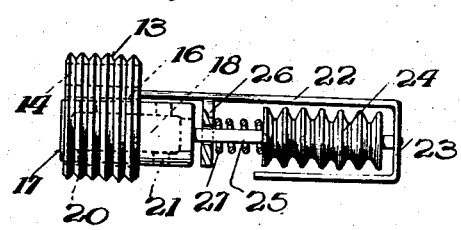
Inventors
Paul L. Betz
Sebastian Karrer
By Cameron, Kerkam & Sutton
Attorneys Patented Oct. 14, 1941

2,258,696

UNITED STATES PATENT OFFICE 2,258,696

STORAGE WATER HEATER

Paul L. Betz, Baltimore, Md., and Sebastian Karrer, Washington, D. C., assignors to Consolidated Gas Electric Light and Power Company of Baltimore, Baltimore, Md., a corporation of Maryland Application August 11, 1937, Serial No. 158,556

6 Claims. (Cl. 122—16)

This invention relates to water heaters of the storage type, and more particularly to water heaters of the type employing gas or other fuel as the source of heat.

Storage water heaters present the problem of bringing a relatively large volume of water to the desired elevated temperature without an uneconomical use of fuel and at the same time supplying relatively hot water to the mains without plying relatively hot water to the mains without an undue lapse of time. To raise the entire volume of the contents of a storage tank to the desired elevated temperature of necessity requires a considerable period of time even though a relatively large source of heat is made available, and accordingly, in order that hot water may be obtained without too great a lapse of time after the heater is started, it is customary to provide burners which are materially larger than is desirable for the most economical use of the fuel.

In the use of electricity for heating storage tanks it is possible to provide separate heating units at the top and bottom of the tank, so that the upper heating unit shall first provide a prompt supply of relatively hot water for early withdrawal, and then by thermostatic control the upper heater may be cut out and the lower heater thereafter used for bringing the entire body of water in the tank to the desired temperature, but so far as we are aware no satisfactory provision has heretofore been made for supplying a body of hot water at the top of the tank before the entire contents is heated where gas or other fuel has been used for heating the water.

It has been proposed to provide a water leg interiorly of a center flue so that the small body of water contained in said leg may be heated and rise to the top of the tank, but the proposed constructions result in the production of dangerously high water temperatures at the top of the tank if the normal setting of the tank thermostat is preserved. If excessive temperature is prevented by adjusting the thermostat to a lower setting the total quantity of heat stored in the water is reduced. In either case the operation is unsatisfactory.

One of the objects of the invention is to regulate the flow of water through the water leg so that the tank thermostat will control the water temperature adequately.

It is another object of this invention to provide a device of the type characterized which may readily predetermine the rate at which the temperature of the water rises at the top of the tank.

Another object of this invention is to provide a device of the type characterized with means for controlling the temperature of the water at the top of the tank so as to prevent the building up of dangerously high temperatures as a result of the continued normal operation of the burner.

Another object of this invention is to provide a device of the type characterized with means to increase the efficiency with which heat is transferred from the hot products of combustion to the water contained in the tank.

Another object of this invention is to so construct a storage heater that soon after the burner is put into operation hot water will be available at the water outlet of the tank while at the same time a material saving in fuel may be effected by the use of a smaller rate of fuel consumption.

Other objects will appear as the description of the invention proceeds.

The present invention is particularly adaptable to the type of water heater employing one or more internal flues, but in its broader aspects the present invention may be applied to water heaters of the external flue type wherein the products of combustion pass through a shell or flues surrounding or outside of the water-containing space. For purposes of illustration, however, the invention will be explained as applied to a storage water heater having a single internal flue, but it will be apparent to those skilled in the art that the same may be applied to heaters using a plurality of internal flues or heaters using external flues.

The invention is capable of receiving a variety of mechanical expressions only one of which is shown on the accompanying drawing, but it is expressly understood that the drawing is for purposes of illustration only, and is not to be construed as a definition of the limits of the invention, reference being had to the appended claims for that purpose.

Referring in detail to the drawing, wherein like reference characters indicate like parts in the several figures, Fig. 1 is an axial section of a storage water heater, of the single internal flue type, embodying the present invention;

Fig. 2 is an enlarged fragmentary view of the outlet end of the water leg;

Fig. 3 is a corresponding face view, Figs. 2 and 3 showing a constrictor without automatic control;

Fig. 4 is a side elevation on a smaller scale of a constrictor provided with automatic control; and Fig. 5 is a face view of the constrictor of Fig. 4 with the valve unit and valve control unit removed.

In the form shown, the tank 1 of the storage water heater may be made of any suitable size, construction and material. As shown, said tank has top and bottom heads, 2 and 3 respectively, which are attached to the wall of the tank in any suitable manner as by riveting or welding so as to provide water-tight joints. Extending through apertures in the top and bottom heads 2 and 3 is a flue 4 of any suitable size, construction and material such as steel, said flue being attached to said heads in any suitable manner, as by welding, so as to provide leak-proof joints. Disposed below the bottom head 3 is a burner compartment 5 in which is a burner of any suitable character and construction (not shown) for burning any suitable fuel. The products of combustion from the burner first impart heat to the water in the tank through lower head 3, and then passing up through flue 4 they impart heat to the water within the tank 1 through the wall of said flue 4. Tank 1 is provided with a suitable cold water inlet at 6 and a suitable hot water outlet at or adjacent the top of the tank at 7.

Disposed within said flue 4, and preferably arranged concentrically therewith, is a water leg 8, shown as extending along the major part of the length of the flue 4 and including lateral portions 9 and 10 which communicate with the interior of the tank 1 adjacent the top and bottom thereof. As shown more particularly in Fig. 2, the wall of the flue 4 is preferably provided with depressions 11 and 12 which surround apertures approximating the external diameter of said lateral portions 9 and 10 of the water leg, and said lateral portions are then secured in said depressions in any suitable way, as by welding, so as to form fluid-tight joints. The depressions assure that the ends of the lateral portions 9 and 10 and the welds thereof lie below the cylindrical surface defined by the outer face of the flue 4, so that said flue may be inserted through the openings in the heads of the tanks without interference because of the presence of the water leg and its welded joints.

Water leg 8 is made of such diameter that the impedance to the flow of water therethrough is small, so that only a small rise in temperature would be necessary to produce such a change of density in the contained water as to cause a circulation through the water leg. Inasmuch as the water leg thus has a relatively large diameter, there is little danger of it becoming clogged by dirt, rust, or other deposits. Cool water will tend to enter at the bottom 10 of the water leg, be heated in the vertical portion thereof, and be discharged at the outlet 9 near the top of the tank, but as the diameter of the water leg is such that upon a small rise in temperature such a circulation would be set up, the water delivered at the top of the tank would be at only a small temperature difference from that existing at the bottom of the tank, and hence a relatively long time would be necessary to effect such a circulation through the water leg as to raise the temperature at the top of the tank to the desired degree.

In conformity with the present invention means are provided whereby the water at the top of the tank is quickly brought to the desired high temperature at a controlled and predetermined rate. To this end the water leg is provided at any suitable location with a constrictor which will predetermine the rate at which the temperature of the water in the water leg is raised and therefore the temperature attained by the water delivered to the top of the tank, said constrictor being preferably adjustable or readily removable for replacement by a constrictor of different effective dimensions so as to predeterminately vary the amount of heat imparted to the water as it passes through the leg 8. The constrictor may be applied to the water leg at any suitable point but is illustrated in the drawing as applied to the outlet end 9 thereof. As shown, the end 9 of the water leg 8 is internally threaded, and an exteriorly threaded constrictor is disposed therein, said constrictor being in the form of a plug 13 having an orifice 14 of predetermined size and preferably arranged eccentrically therein at or adjacent the periphery of the constrictor in order that when inserted in the outlet 9 of the water leg said plug 13 may be turned so as to dispose the orifice 14 at the upper portion thereof as shown in Fig. 3 so as to eliminate the collection of steam, air or other gas within the water leg behind said plug.

Directly opposite the end 9 of the water leg and its plug 13 the wall of the tank 1 is provided with a suitable tapped opening 15 which is normally filled by a plug or other suitable closure member. By removing said plug at 15 access may be readily gained to the plug 13 in the event that it is desired to clean said orifice 14 or remove the plug 13 in the event that it becomes desirable to replace said plug by one having a different sized orifice 14. Plug 13 may be formed for engagement by a spanner wrench or otherwise suitably constructed to facilitate insertion and withdrawal through aperture 15.

The size of the orifice 14 governs the rate at which water passes through the water leg 8, and therefore by varying the size of said orifice 14 the rate at which the water temperature increases in the top of the tank may be nicely predetermined. Thus, if a higher rate of temperature rise is desired with a more rapid attainment of such temperature a smaller orifice 14 should be used, while if a lower rate of temperature rise is desired a larger orifice may be used. Therefore, by inserting a plug having the desired orifice size the rate at which the desired temperature at the top of the tank is attained may be adjusted so that the water will not overheat before the regular tank thermostat operates to shut off the fuel supply, but once the plug 13 with its orifice 14 is installed the rate of heating of the water at the top of the tank becomes a fixed characteristic of the heater, and to vary said rate plug 13 must be removed and a different plug with a suitably sized orifice 14 installed. Therefore, the present invention, in its broader aspects, provides means for predetermining the rate at which the temperature at the top of the tank shall rise in order to assure that the tank shall be ready to deliver hot water of a predetermined temperature after a predetermined lapse of time, said temperature preferably approximating that which the tank is designed to deliver under normal storage conditions, although a lower temperature may be selected if preferred. This temperature will be herein referred to as the relatively high temperature at which water is to be supplied at the outlet of the tank. To attain this temperature, the temperature of the water flowing from the water leg may be above the designed delivery temperature where the conditions are such that the temperature of the water flowing from the water leg is lowered by contact with or mixture with the water at the top of the tank.

As has been indicated above, the constrictor illustrated in Figs. 2 and 3 results in a fixed characteristic for the water heater. As contrasted to this, the present invention also provides means to change the rate of heating of the water at the top of the tank during the operation of the burner so that at the start the rate of rise of water temperature at the top of the tank is more rapid than later when a predetermined temperature has been attained. To this end the constrictor is preferably provided with temperature responsive means for increasing the rate of flow through the water leg 8 if the temperature at the top of the tank increases beyond a predetermined maximum. Said means includes a thermally responsive valve for increasing the size of the aperture in plug 13 or for opening a second aperture therein. As shown plug 13 is provided with a second and larger aperture which may be controlled by a valve of any suitable construction, as a seating valve, sleeve valve, or the like, operatively connected to a temperature responsive element of any suitable form, as a bimetallic, liquid or vapor element, etc., it being expressly understood that the invention is not restricted to any particular form of valve or any particular form of temperature responsive element to actuate the same.

Referring to Figs. 4 and 5 the constrictor 13 is shown as provided with a second and larger aperture 16 which also extends through the plug. Cooperating with said aperture 16 is a valve member 17 of any suitable form. As here shown, it is a plug of size and shape such that it may slide freely in the aperture 16, said plug having an axially extending passage 18 which ends adjacent the opposite extremities of the valve member 17 in one or more transverse passages 20 and 21. Mounted on said plug 13 in any suitable way is a bracket 22 provided adjacent its free end with a transverse member 23 to which is attached in any suitable way the stationary end of a thermally responsive element 24, the opposite end of said element being connected to a stem 25 that is connected to the valve member 17. Said bracket also carries a second apertured transverse member 26 which functions as a guide for said valve stem. Interposed between said member 26 and the movable end wall of said thermally responsive element is a spring 27 which normally urges the element toward collapsed position, in which position water cannot flow through aperture 16.

For purposes of illustration the flow control unit is disposed in the upper portion of the tank adjacent to the point of delivery of water from the leg 8 through aperture 14 and it will respond when the predetermined temperature has been reached to move said valve member toward the left as viewed in Fig. 4 until the transverse apertures 20 in said valve member 17 are in communication with the water leg 8, whereby water may flow freely from said water leg to the tank 1 and thus the rate at which the temperature rises at the top of the tank is materially decreased. By suitably selecting the size of opening controlled by the flow device the rate of heating in the water leg can again be nicely predetermined so as to control the further rise of temperature at the top of the tank. Thereafter, until the water temperature at the top of the tank is decreased by withdrawal of hot water so as to permit the thermally responsive element to close said valve member, the storage water heater functions more nearly in its normal way until the temperature of the entire body of water in the tank has risen to that degree at which the tank thermostat discontinues the operation of the burner.

It will therefore be perceived that by the present invention means have been provided whereby the temperature at the top of the tank may be quickly raised to the desired degree and in a relatively short period of time, and the rate at which said desired temperature is attained can be nicely predetermined. As the present invention thus enables a body of hot water to be provided at the top of the tank within a relatively short period of time the rate of fuel consumption can be reduced to that which is most economical and efficient, particularly as the disposition of the water leg within the flue provides a more efficient abstraction of heat from the rising products of combustion. At the same time the bringing of a body of water at the top of the storage tank to the desired high temperature cannot produce dangerous conditions, because if the water at the top of the tank tends to become overheated by reason of the use of the water leg with its constrictor, the characteristics of the heater are promptly changed by reason of the automatic opening of a second aperture to cause a decrease in the rate of heating of the water at the top of the tank. Thus the present invention enables the use of a water leg of a size which will not become readily obstructed and which would not by itself enable the desired rapid rise of temperature at the top of the tank, and yet means have been provided whereby the desired rapid rise of temperature is obtained by means which can be nicely predetermined so as to control said rate of temperature rise.

Moreover, the present invention provides that said means is readily accessible for cleaning, because by removal of the plug at 15 the constrictor 13 either with or without a thermally responsive device as heretofore described can be readily reached for removal by a spanner or other suitable means. Thus the constrictor may be readily removed for cleaning at the only place where obstruction is likely to occur and if for any reason a different characteristic is desired for the heater, said constrictor is readily accessible for replacement by one having a differently sized orifice to give a different rate of heating and temperature rise at the top of the tank.

While the embodiment of the invention illustrated on the drawing has been described with considerable particularity, it is to be expressly understood that the invention is not to be restricted thereto, as the same is capable of receiving a variety of mechanical expressions, some of which will now readily suggest themselves to those skilled in the art, while changes may be made in the details of construction, arrangement and proportion of parts, and certain features used without other features without departing from the spirit of the invention. Thus the flow control device may be omitted within the broader aspects of the present invention if the absence of overheating at the top of the tank is assured, and any other suitable form of valve or any other suitable form of temperature responsive element may be employed. For example, by making the bracket 22 and the valve stem of differentially expansible materials, the valve stem itself, subject as it is to the relatively hot water at the top of the tank, may by its expansion effect the opening of the valve. Therefore, reference is to be had to the appended claims for a definition of this invention.

What is claimed is:

1. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating with said tank, the outlet of said water leg being adjacent the top of the tank and said water leg having a cross section such that the flow that would be normally induced therethrough by the heating of the water in said water leg would result in only a relatively small rise in the temperature thereof, a constrictor in said water leg including an aperture whose cross section is such as to predeterminately control the rate of heating of the water in said water leg, and temperature controlled means responsive to the temperature at the top of said tank for by-passing said aperture whereby the rate of flow of water through said water leg is increased if the temperature at the top of said tank increases above a predetermined maximum.

2. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating at opposite ends with said tank, the outlet of said water leg being adjacent the top of the tank and said water leg having a cross section such that the flow that would be normally induced therethrough by the heating of the water in said water leg would result in only a relatively small rise in the temperature thereof, a constrictor in said water leg including an aperture whose cross section is such as to predeterminately control the rate of heating of the water in said water leg, said constrictor also including a second aperture, a valve controlling said second aperture, and temperature responsive means subjected to the temperature at the top of said tank for opening said valve if the temperature at the top of said tank exceeds a predetermined maximum.

3. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating at opposite ends with said tank, the outlet of said water leg being adjacent the top of the tank and said water leg having a cross section such that the flow that would be normally induced therethrough by the heating of the water in said water leg would result in only a relatively small rise in the temperature thereof, a constrictor in said water leg including an aperture whose cross section is such as to predeterminately control the rate of heating of the water in said water leg, said constrictor including a removable plug, and thermally actuated valve mechanism mounted on said plug and removable therewith for increasing the flow of water through said water leg if the temperature at the top of the tank exceeds a predetermined maximum.

4. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating at opposite ends with said tank, the outlet of said water leg being adjacent the top of the tank and said water leg having a cross section such that the flow that would be normally induced therethrough by the heating of the water in said water leg would result in only a relatively small rise in the temperature thereof, a constrictor mounted in said water leg and including an aperture whose cross section is such as to predeterminately control the rate of heating of the water in said water leg, said constrictor containing a second aperture whose cross section is such that when opened the flow therethrough causes the rate of heating in said water leg to be predeterminately lowered, and temperature responsive valve mechanism associated with said second named aperture and responsive to the temperature at the top of said tank for controlling said second named aperture.

5. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating at opposite ends with said tank, the outlet of said water leg being adjacent the top of the tank and said water leg having a cross section such that the flow that would be normally induced therethrough by the heating of the water in said water leg would result in only a relatively small rise in the temperature thereof, means for constricting said water leg and predetermining the rate of flow therethrough so that the water flowing from said water leg shall raise the temperature at the top of the tank to substantially that which it is desired to deliver from the outlet of said tank, and thermally responsive means subject to the temperature at the top of said tank for increasing the effective aperture of said constrictor if the temperature at the top of said tank exceeds a predetermined maximum, whereby the rate of flow of water through said water leg is increased.

6. In a storage water heater, in combination with a storage tank and a flue through which products of combustion are passed to impart heat to the water in said tank, means for providing water at a relatively high temperature at the top of said tank in advance of heating the entire body of water in said tank to a like temperature, said means including a water leg disposed in said flue and communicating at opposite ends with said tank, the outlet of said water leg being adjacent the top of the tank and said water leg having a cross section such that the flow that would be normally induced therethrough by the heating of the water in said water leg would result in only a relatively small rise in the temperature thereof, means removably mounted in said water leg and containing an aperture whose size is such that the flow of water through said water leg is decreased sufficiently to effect an elevation of the temperature in the water delivered therefrom sufficiently to obtain the relatively high temperature desired at the outlet of said tank, and means including a thermally operated valve mechanism responsive to the temperature at the top of said tank and adapted to increase the rate of flow through said water leg for preventing overheating of the water at the top of the tank if the temperature thereat exceeds a predetermined maximum.

PAUL L. BETZ.
SEBASTIAN KARRER.